UNITED STATES PATENT OFFICE.

STUART P. MILLER, OF PHILADELPHIA, PENNSYLVANIA, ASSIGNOR TO THE BARRETT COMPANY, A CORPORATION OF NEW JERSEY.

PROCESS OF PRODUCING RESIN.

1,360,665.  Specification of Letters Patent.  Patented Nov. 30, 1920.

No Drawing.  Application filed March 8, 1920. Serial No. 364,146.

*To all whom it may concern:*

Be it known that I, STUART P. MILLER, a citizen of the United States, residing at 603 York road, Philadelphia, in the county of Philadelphia and State of Pennsylvania, have invented certain new and useful Improvements in Processes of Producing Resin, of which the following is a specification.

This invention relates to the preparation of resins from naphthas containing polymerizable constituents, such as coumarone, indene, etc., and has for its purpose the preparation of resins of lighter color and of higher melting point than those obtained by the usual and previously described methods of preparation.

It is well known that when a naphtha containing polymerizable constituents, such as the coumarone-indene series of compounds, is treated with a polymerizing agent, as for example, sulfuric acid, or aluminum chlorid, or when it is subjected to heat and pressure, the coumarone and indene are polymerized. When the naphtha containing the polymerized coumarone and indene in solution is separated from the polymerizing agent, neutralized with a solution of an alkali, separated from the alkaline solution, washed, and distilled to remove unpolymerized material, the polymerized indene and coumarone remain behind in the still as a liquid which solidifies to a resin on cooling. This resin is commonly known as paracoumarone, and the term is often used to designate the resin which consists of the usual polymerization products of this series of compounds. As commonly prepared, this resin is contaminated by certain impurities which give it a red or brown or even black color. Moreover, certain of the impurities present may cause the resin to have a rather low melting point. The exact nature of all of these impurities is not known, but it is known that one of the impurities which causes the low melting point is an oil which is heavier than water and which distils at a temperature above 250° C. This oil is a polymerized material with an apparent molecular weight of less than two hundred and fifty. It has been found that the formation of this oil decreases the yield of the true resinous polymer obtained by the polymerization of any given naphtha. This oil may be removed by passing steam through the melted resin, but to remove any considerable amount of this oil the steam must be passed through the resin for a rather long period of time, or even necessitates the use of steam distillation under a vacuum. This long continued steam distillation is expensive and causes the resin to darken considerably.

In addition to this oil, which shall hereinafter be referred to as "heavy oil," the resin prepared by the commonly used process described above contains certain other substances which cause it to have a low melting point, or a dark color, or both. These substances cannot be removed by ordinary distillation with steam.

The present invention enables the applicant to produce from naphthas containing polymerizable constituents of the cumarone-indene series, resins which have a lighter color and a higher melting point than the resins prepared by the commonly used processes mentioned above. Moreover, the hereinafter described process causes the formation of a minimum amount of heavy oil, thus decreasing the length of time of steam distillation required to give a product with a maximum obtainable melting point, and even rendering the employment of vacuum distillation unnecessary. The amount of darkening in color incident to this steam distillation is thus minimized.

In practising this invention, the naphtha containing the coumarone, or indene, or both, or the compounds belonging to this series, may be given a preliminary wash with a solution of sulfuric acid containing not more than seventy-seven per cent. of actual sulfuric acid, for the purpose of removing certain impurities which would otherwise remain in the naphtha to contaminate and discolor the final resin. The wash acid and accompanying impurities are then drawn off and the washed oil is cooled to a temperature below twenty degrees centigrade or even to 20 below zero centigrade or lower. It has been found to be true that in general the lower the temperature of polymerization, the higher the melting point, and the lighter the color of the resin produced. A temperature of 20° C. is fixed as that above which the process must not be operated for satisfactory results. The oil is then agitated at this low temperature below twenty degrees centigrade with a small amount, as for example, five per cent. of its own volume of strong sulfuric acid. The acid used for polymerization may be of any concentration above seventy-seven per cent.; an acid containing approximately ninety-three per cent. of sulfuric acid is commonly used.

Instead of treating the oil which has been cooled below 20° C. with sulfuric acid to polymerize it, the cooled oil may be treated with an amount of aluminium chlorid equal to about 0.25% to 1.25%, more or less, of the weight of the oil, while the whole is being agitated and the low temperature maintained. The amount of aluminium chlorid should not exceed 2% at the most under ordinary conditions and with the usual naphthas. In a similar manner, advantageous results are obtained by polymerizing at temperatures below 20° C. irrespective of what polymerizing reagent is employed.

After the polymerization has been completed at the low temperature the mixture is permitted to settle and the polymerizing agent is drawn off, and the naphtha may then be further washed out with water to remove more of the polymerizing agent. The remaining naphtha is then neutralized with a suitable alkaline reagent, such, for example, as sodium hydroxid, and permitted to settle, after which the alkaline reagent may be drawn off and the oil may then be washed with water which is then settled and drawn off. After the washing, settling, and separation operations are finished, the solvent naphtha containing the resin in solution may be distilled in the ordinary way to remove the more volatile products, after which live steam distillation under vacuum may be resorted to, if necessary, to remove the heavy oils. If any heavy oils remain mixed with the resin the melting point of the mixed resin and heavy oil will be below that of the resin itself. The process described in this application differs from the well known and previously described processes for the manufacture of resins of this sort in that the polymerization is effected at temperatures below twenty degrees, whereas in the previously described processes the polymerization has been effected at temperatures considerably above twenty degrees centigrade. This present application is designed to cover specifically the polymerization below the specified temperatures of twenty degrees centigrade whether sulfuric acid or aluminium chlorid or other suitable polymerizing agent is used for polymerizing purposes.

In order to maintain the temperature below the specified limit the oil may be cooled by placing it in a container provided with suitable cooling apparatus, as, for example, coils, through which a suitable refrigerating agent, as, for example, cold brine, is circulated.

The advantages gained by the use of the lower temperature of polymerization are as follows:

The yield of resin from any given naphtha is higher. Thus, from one particular sample of naphtha the resin obtained by polymerization at ten degrees centigrade was equivalent to sixty per cent. by weight of the original naphtha, while the polymerization of another portion of the same naphtha at sixty degrees centigrade gave resin equivalent to only forty-five per cent. of the weight of the original naphtha.

The resin obtained has a higher melting point. Thus a sample of resin prepared by polymerization at ten degrees centigrade had a melting point of one hundred and fifty degrees centigrade, while another sample of resin prepared by the polymerization of another portion of the same naphtha at sixty degrees centigrade had a melting point of only ninety-nine and five-tenths degrees centigrade.

The resin obtained from any given naphtha has a lighter color and is therefore generally more valuable for use in the arts.

The amount of heavy oil formed is less, so that the time required for steam distilling the heavy oil from the resin is materially decreased, and the use of a vacuum for distillation may be dispensed with.

It is apparent, therefore, that by maintaining a lower temperature during polymerization a distinct improvement over the previously described methods for the preparation of paracoumarone and paraindene resins is effected, in that the yield of the resin is increased, the quality of the resin is improved, and the cost of producing the resin is decreased.

Having now described my invention, what I claim as new and desire to secure by Letters Patent is:

1. The herein described process which comprises polymerization of polymerizable constitutents in solution in a naphtha by treating the naphtha with a polymerizing agent at a temperature below twenty degrees centigrade.

2. The herein described process which comprises polymerization of a compound of the coumarone-indene series in solution in a naphtha by treating the naphtha with a polymerizing agent at a temperature below twenty degrees centigrade.

3. The herein described process which comprises polymerization of indene in solution in a naphtha by treating the naphtha with a polymerizing agent at a temperature below twenty degrees centigrade.

4. The herein described process which comprises polymerization of polymerizable constituents in solution in a naphtha by treating the naphtha with aluminum chlorid below twenty degrees centigrade.

5. The herein described process which comprises polymerization of a compound of the coumarone-indene series in solution in a naphtha by treating the naphtha with aluminum chlorid below twenty degrees centigrade.

6. The herein described process which comprises polymerization of indene in solution in a naphtha by treating the naphtha with aluminium chlorid at a temperature below twenty degrees centigrade.

In testimony whereof I affix my signature.

STUART P. MILLER.